United States Patent
Cox et al.

(10) Patent No.: US 8,356,011 B2
(45) Date of Patent: Jan. 15, 2013

(54) ORGANIZING PRESENCE INFORMATION INTO COLLECTIONS OF PUBLICATIONS

(75) Inventors: Shaun D. Cox, Redmond, WA (US); Timothy J. Rang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1173 days.

(21) Appl. No.: 11/190,503

(22) Filed: Jul. 26, 2005

(65) Prior Publication Data

US 2007/0027702 A1    Feb. 1, 2007

(51) Int. Cl.
    *G06F 17/30* (2006.01)
(52) U.S. Cl. .......................... 707/627; 707/706
(58) Field of Classification Search ...... 707/9; 725/100; 715/500
    See application file for complete search history.

(56) References Cited

U.S. PATENT DOCUMENTS

| | | | |
|---|---|---|---|
| 4,953,159 A | 8/1990 | Hayden et al. | |
| 5,195,086 A | 3/1993 | Baumgartner et al. | |
| 5,437,009 A | 7/1995 | Lane | |
| 5,793,365 A | 8/1998 | Tang et al. | |
| 5,857,189 A | 1/1999 | Riddle | |
| 5,995,492 A | 11/1999 | Klein et al. | |
| 5,999,208 A | 12/1999 | McNerney et al. | |
| 6,237,025 B1 | 5/2001 | Ludwig et al. | |
| 6,356,921 B1 | 3/2002 | Kumar et al. | |
| 6,419,848 B1 | 7/2002 | Qiu et al. | |
| 6,559,863 B1 | 5/2003 | Megiddo | |
| 6,671,732 B1 | 12/2003 | Weiner et al. | |
| 6,757,722 B2 | 6/2004 | Lonnfors et al. | |
| 6,985,934 B1 | 1/2006 | Armstrong et al. | |
| 6,991,855 B2 | 1/2006 | Weihs et al. | |
| 7,240,093 B1 | 7/2007 | Danieli et al. | |
| 7,302,270 B1 * | 11/2007 | Day | 455/456.1 |
| 7,469,384 B2 | 12/2008 | Thompson et al. | |
| 7,650,337 B2 | 1/2010 | Cox | |
| 2002/0035605 A1 | 3/2002 | McDowell et al. | |
| 2002/0055967 A1 | 5/2002 | Coussement | |
| 2002/0075303 A1 | 6/2002 | Thompson et al. | |
| 2002/0075304 A1 | 6/2002 | Thompson et al. | |
| 2002/0075305 A1 | 6/2002 | Beaton et al. | |
| 2002/0075306 A1 | 6/2002 | Thompson et al. | |
| 2002/0076025 A1 | 6/2002 | Liversidge et al. | |

(Continued)

FOREIGN PATENT DOCUMENTS

EP    1143363    10/2001

(Continued)

OTHER PUBLICATIONS

Rosenberg, J., "A Presence Event Package for the Session Intiation Protocol (SIP)," Aug. 2004, Network Working Group, RFC 3856, © The Internet Society 2004.

(Continued)

*Primary Examiner* — Sheree Brown
(74) *Attorney, Agent, or Firm* — Merchant & Gould P.C.

(57) ABSTRACT

A method and system for managing presence information based on collections of publications is provided. The presence system creates collections of publications for a publisher. A publication includes a type and value. A publisher may define one collection of publications that is to be made available to certain subscribers and another collection of publications that is to be made available to other subscribers. The presence system may allow a publisher to update individual publications within a collection. Moreover, the presence system may identify subscribers of a collection at the time of subscription.

16 Claims, 12 Drawing Sheets

U.S. PATENT DOCUMENTS

| | | | |
|---|---|---|---|
| 2002/0078150 | A1 | 6/2002 | Thompson et al. |
| 2002/0106998 | A1 | 8/2002 | Presley et al. |
| 2002/0141479 | A1 | 10/2002 | Garcia-Luna-Aceves et al. |
| 2003/0131073 | A1 | 7/2003 | Lucovsky et al. |
| 2003/0158902 | A1 | 8/2003 | Volach |
| 2003/0217142 | A1 | 11/2003 | Bobde et al. |
| 2003/0236086 | A1 | 12/2003 | Litwin |
| 2004/0137921 | A1 | 7/2004 | Valloppillil et al. |
| 2005/0034079 | A1 | 2/2005 | Gunasekar et al. |
| 2005/0046011 | A1 | 3/2005 | Chen et al. |
| 2005/0068167 | A1 | 3/2005 | Boyer |
| 2005/0142495 | A1 | 6/2005 | Van Heerden et al. |
| 2005/0198321 | A1 | 9/2005 | Blohm |
| 2005/0210104 | A1 | 9/2005 | Torvinen |
| 2005/0216848 | A1 | 9/2005 | Thompson et al. |
| 2005/0246544 | A1 | 11/2005 | Moore et al. |
| 2005/0270157 | A1 | 12/2005 | Mohammed et al. |
| 2006/0004921 | A1 | 1/2006 | Suess et al. |
| 2006/0021734 | A1 | 2/2006 | Chang et al. |
| 2006/0026141 | A1 | 2/2006 | Brubacher et al. |
| 2006/0030264 | A1 | 2/2006 | Morris |
| 2006/0190600 | A1* | 8/2006 | Blohm et al. .................. 709/225 |
| 2006/0224688 | A1 | 10/2006 | Morris |
| 2006/0280166 | A1 | 12/2006 | Morris |
| 2006/0282856 | A1* | 12/2006 | Errico et al. .................... 725/46 |
| 2007/0027702 | A1 | 2/2007 | Cox et al. |
| 2007/0078965 | A1 | 4/2007 | Shimamura et al. |
| 2007/0100831 | A1 | 5/2007 | Cox |
| 2007/0198725 | A1 | 8/2007 | Morris |
| 2007/0239866 | A1 | 10/2007 | Cox et al. |
| 2007/0266076 | A1 | 11/2007 | Cox et al. |
| 2008/0134259 | A1* | 6/2008 | He ................................. 725/91 |
| 2009/0161293 | A1 | 6/2009 | Takeuchi et al. |
| 2009/0163019 | A1 | 6/2009 | Srivastava et al. |
| 2010/0217782 | A1 | 8/2010 | Milligan et al. |

FOREIGN PATENT DOCUMENTS

| | | |
|---|---|---|
| KR | 10-2001-0086883 | 9/2001 |
| KR | 20010086883 | 9/2001 |
| KR | 20020044734 | 6/2002 |
| KR | 10-2002-0074303 | 9/2002 |
| KR | 200200074304 | 9/2002 |
| KR | 10-2004-0026389 | 3/2004 |
| KR | 20040025389 | 3/2004 |
| KR | 20040091181 | 10/2004 |
| KR | 20050076401 | 7/2005 |
| RU | 2005/104119 | 10/2005 |
| RU | 2005104119 | 10/2005 |
| WO | WO-01/41477 | 6/2001 |
| WO | WO-2004105411 | 12/2004 |
| WO | WO2005/039221 A1 | 4/2005 |
| WO | 2005/045563 | 5/2005 |
| WO | 2005/104569 | 11/2005 |

OTHER PUBLICATIONS

Lonnfors, M. et al., "Partial Publication of Presence Information draft-ietf-simple-partial-publish-01," Oct. 24, 2004, SIMPLE WG, Internet Draft, © The Internet Society 2004.

Lonnfors, M. et al., "Presence Information Data format (PIDF) Extension for Partial Presence draft-ietf-simple-partial-pidf-format-02," Oct. 25, 2004, SIMPLE WG, Internet Draft, © The Internet Society 2004.

Khartabil, H. et al., "An Extensible Markup Language (XML) Based Format for Event Notification Filtering draft-ietf-simple-filter-format-03," Oct. 4, 2004, SIMPLE, Internet-Draft, © The Internet Society 2004.

Sparks, Robert, "Mobility Plus Presence: Standards On the Fast Track," Jan. 6, 2005, Converge! Network Digest, Blueprint: Circuit-to-Packet, Converge! Media Ventures, Inc., http://www.convergedigest.com/bp-c2p/bp1.asp?ID=185&ctgy=.

Rajaniemi, Hannu-Pekka and Kliment Yanev, "SIP and Presence," http://www.cs.helsinki.fi/u/yanev/simplep.pdf, [last accessed Jul. 26, 2007].

Schulzrinne, Henning, "RPIDS—Rich Presence Information Data Format for Presence Based on the Session Initiation Protocol (SIP)," Feb. 21, 2003, Internet Engineering Task Force, DRAFT, © The Internet Society (2003).

Jachner, J. et al., "Rich Presence: A New User Communications Experience," Technology White Paper, User-Centric Conferencing and Collaboration, Alcatel Telecommunications Review, 1st Quarter 2005,© Mar. 2005 Alcatel.

Rosenberg et al., "SIP: Session Initiation Protocol," Jun. 2002, Network Working Group, RFC 3261, Standards Track, © The Internet Society 2002.

Patent Cooperation Treaty International Search Report, Jun. 5, 2007, International Application No. PCT/US2007/001980, Applicant: Microsoft Corporation, Date of Mailing: Jun. 5, 2007, (7 pages).

Patent Cooperation Treaty International Search Report, Jun. 15, 2007, International Application No. PCT/US2007/001985, Applicant: Microsoft Corporation, Date of Mailing: Jun. 15, 2007 (8 pages).

Patent Cooperation Treaty International Search Report, Jun. 25, 2007, International Application No. PCT/US2007/001007, Applicant: Microsoft Corporation, Date of Mailing: Jun. 25, 2007 (8 pages).

Rosenberg, J., "A Data Model for Presence," Cisco Systems, Feb. 21, 2005, SIMPLE Internet Draft (34 pages).

Rosenberg, J., "A Data Model for Presence," Cisco Systems, Oct. 25, 2004, SIMPLE, Internet Draft (41 pages).

Communication from Chilean Patent Office for Chilean Application No. 473-2007, First Office Action, dated Feb. 2, 2007 (5 pages).

Communication from Chinese Patent Office for Chinese Application No. 200780012043.X, First Office Action, dated Nov. 20, 2009 (10 pages).

Communication from Chinese Patent Office for Chinese Application No. 200780012043.X, Response to First Office Action, dated Mar. 18, 2010 (17 pages).

Communication from Chinese Patent Office for Chinese Application No. 200780012043.X, Second Office Action, dated Jul. 29, 2010 (10 pages).

Communication from Chinese Patent Office for Chinese Application No. 200780012043.X, Response to Second Office Action, dated Nov. 29, 2010 (17 pages).

Communication from Chinese Patent Office for Chinese Application No. 200780012043.X, Third Office Action, dated Feb. 23, 2011 (10 pages).

Communication from Chinese Patent Office for Chinese Application No. 200780012232.7, First Office Action, dated Dec. 11, 2009 (12 pages).

Communication from Chinese Patent Office for Chinese Application No. 200780012232.7, Response to First Office Action, dated Apr. 22, 2010 (19 pages).

Communication from Chinese Patent Office for Chinese Application No. 200780012232.7, Notice on Grant of Patent Right and Proceeding with the Registration Formalities, dated Jul. 2, 2010 (6 pages).

Communication from Chinese Patent Office for Chinese Application No. 200780012222.3, First Office Action, dated Dec. 31, 2010 (11 pages).

Communication from Russian Patent Office for Russian Application No. 2008138710, First Office Action, dated Apr. 14, 2010 (6 pages).

Communication from Russian Patent Office for Russian Application No. 2008138712, First Office Action, dated Jan. 28, 2011 (6 pages).

Communication from Russian Patent Office for Russian Application No. 2008138711, Firs Office Action, dated Mar. 1, 2011 (6 pages).

Non Final Office Action from the United States Patent Trademark Office, U.S. Appl. No. 11/278,309, dated May 11, 2009 (13 pages).

Arguments and Amendments in Response to Non-Final Office Action from United States Patent Trademark No., U.S. Appl. No. 11/278,309, dated Aug. 11, 2009 (13 pages).

Final Office Action from the United States Patent Trademark Office, U.S. Appl. No. 11/278,309, dated Dec. 28, 2009 (14 pages).

Arguments and Amendments in Response to Final Office Action from United States Patent Trademark No., U.S. Appl. No. 11/278,309, dated Mar. 29, 2010 (12 pages).

Non Final Office Action from the United States Patent Trademark Office, U.S. Appl. No. 11/278,309, dated Apr. 28, 2010 (16 pages).

Arguments and Amendments in Response to Non-Final Office Action from United States Patent Trademark No., U.S. Appl. No. 11/278,309, dated Jul. 28, 2010 (12 pages).
Final Office Action from the United States Patent Trademark Office, U.S. Appl. No. 11/278,309, dated Oct. 27, 2010 (17 pages).
Non Final Office Action from the United States Patent Trademark Office, U.S. Appl. No. 11/278,364, dated Feb. 5, 2008 (11 pages).
Arguments and Amendments in Response to Non-Final Office Action from United States Patent Trademark No., U.S. Appl. No. 11/278,364, dated Jun. 5, 2008 (11 pages).
Non Final Office Action from the United States Patent Trademark Office, U.S. Appl. No. 11/278,364, dated Aug. 6, 2008 11 pages).
Final Office Action from the United States Patent Trademark Office, U.S. Appl. No. 11/278,364, dated Sep. 15, 2008 (10 pages).
Arguments and Amendments in Response to Final Office Action from United States Patent Trademark No., U.S. Appl. No. 11/278,364, dated Dec. 4, 2008 (15 pages).
Non Final Office Action from the United States Patent Trademark Office, U.S. Appl. No. 11/278,364, dated Feb. 20, 2009 (17 pages).
Arguments and Amendments in Response to Non-Final Office Action from United States Patent Trademark No., U.S. Appl. No. 11/278,364, dated May 20, 2009 (16 pages).
Notice of Allowance from the United States Patent Trademark Office, U.S. Appl. No. 11/278,364, dated Aug. 13, 2009 (9 pages).
Non Final Office Action from the United States Patent Trademark Office, U.S. Appl. No. 11/278,338, dated Mar. 23, 2009 (10 pages).
Arguments and Amendments in Response to Non-Final Office Action from United States Patent Trademark No., U.S. Appl. No. 11/278,338, dated Jul. 8, 2009 (10 pages).
Final Office Action from the United States Patent Trademark Office, U.S. Appl. No. 11/278,338, dated Dec. 31, 2009 (18 pages).
Arguments and Amendments in Response to Final Office Action from United States Patent Trademark No., U.S. Appl. No. 11/278,338, dated Mar. 23, 2010 (13 pages).
Non Final Office Action from the United States Patent Trademark Office, U.S. Appl. No. 11/278,338, dated Jun. 28, 2010 (17 pages).
Arguments and Amendments in Response to Non-Final Office Action from United States Patent Trademark No., U.S. Appl. No. 11/278,338, dated Nov. 29, 2010 (12 pages).
Final Office Action from the United States Patent Trademark Office, U.S. Appl. No. 11/278,338, dated Feb. 17, 2011 (18 pages).
Communication from Russian Federation for Russian Application No. 2008138711, Decision on Grant of a Patent for Invention (translation), dated Apr. 13, 2011 (6 pages).
Communication from Russian Patent Office for Russian Application No. 2008138710, First Office Action, dated Dec. 17, 2010 (6 pages).
Schulzrinne Columbia U V Gurbani Lucent P Kyzivat J Rosenberg Cisco H: "RPID: Rich Presence Extensions to the Presence Information Data Format (PIDF); draft-ietf-simple-rpid-09.txt", IETF Standard-Working-Draft, Internet Engineering Task Force, IETF, Ch, vol. simple, No. 9, Sep. 24, 2005, XP015040716, pp. 4-34.
Rosenberg Cisco Systems J: "A Data Model for Presence; draft-ietf-simple-precence-data-model-07.txt", IETF Standard-Working-Draft, Internet Engineering Task Force, IETF, Ch, vol. 7, Jan. 22, 2006, XP015044134, pp. 3-29.
Niemi A et al: Session Initiation Protocol (SIP) Extension for Event State Publication; rfc3903.txt', IETF Standard, Internet Engineering Task Force, IETF, Ch., Oct. 1, 2004, pp. 4-20.
Supplemental European Search Report dated May 26, 2011 in European Application No. 07716619.7, 10 pages.
Decision on Grant of Patent for Invention filed Jan. 16, 2007 in Russian Application No. 2008138710, 6 pages.
Chinese Decision on Rejection mailed Sep. 26, 2011, in Chinese Patent Application No. 200780012043.X (7 pages).
Supplemental European Search Report dated May 26, 2011 in European Application No. 07716619.7, (10 pages).
Notice of Allowance mailed Sep. 13, 2011, in U.S. Appl. No. 11/278,309 (15 pages).
Amendment and Response to Final Office Action mailed Oct. 27, 2010, in U.S. Appl. No. 11/278,309, filed Mar. 28, 2011 (14 pages).
Amendment and Response to Non-Final Office Action mailed Feb. 17, 2011, in U.S. Appl. No. 11/278,338, filed Jul. 18, 2011 (11 pages).
Notice of Allowance mailed Jun. 13, 2011, in U.S. Appl. No. 11/278,309 (15 pgs).
Notice of Allowance mailed Jun. 7, 2011, in U.S. Appl. No. 11/190,503 (14 pgs).
Notice of Allowance mailed Mar. 29, 2012, in U.S. Appl. No. 11/278,338 (10 pgs).
Communication from Chinese Patent Office for Chinese Application No. 200780012222.3, Second Office Action, dated Jan. 18, 2012 (8 pages).
Decision on Grant of Patent for Invention mailed Nov. 15, 2011, in Russian Application No. 2008138712 (25 pgs).
Chinese Response to Decision on Rejection mailed Sep. 26, 2011, in Patent Application No. 200780012043.X, filed Jan. 6, 2012 (15 pgs).
European Amendments filed Apr. 13, 2012, in Application No. 07716619.7, 19 pages.
"Message Proxy with Grouping Feature", IP.COM Journal, IP.COM Inc, West Henrietta, NY, US, Jun. 9, 2008.

* cited by examiner

ORGANIZING PRESENCE INFORMATION INTO COLLECTIONS OF PUBLICATIONS

BACKGROUND

Presence servers are increasingly being used to provide presence information such as the availability status of users. Presence information of a user identifies the current "presence state" of that user. Users may make their presence information available so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence service that then provides the presence information to subscribing users ("subscribers"). Thus, a presence service may use a subscriber/publisher model to provide the presence information for the publishing and subscribing users of the presence service. Whenever the presence information of a user changes, the presence service is notified of the change by that user's computer system and in turn notifies the subscribing users of the change. A subscribing user can then decide how best to contact the publishing user based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call.

Because of the increasing popularity of instant messaging systems and other real-time communications systems, presence services need to support an increasing numbers of users. In addition, these systems need to support increasingly complex definitions of "presence information." For example, presence information may include calendar information that specifies the availability of a publisher during the next several months. As a result, a presence server is typically developed to provide presence services in an efficient way. Unfortunately, typical presence models require intense computation when presence information is updated. Thus, as more publishers and subscribers are added, additional presence servers are needed to perform the necessary computations.

As one example, the Internet Engineering Task Force ("IETF") has published a proposed draft presence model entitled "A Data Model for Presence." That presence model describes that the presence information of a publisher is published by that publisher in an XML document with an associated XML schema. A publisher can update their presence information of the XML document using edit commands such as pointing to a line in the document and replacing it with the word or pointing to a node within an XML subtree and replacing it with another XML subtree. This presence model requires the presence server to parse the XML document based on the XML schema to locate the presence information within the document that is to be updated. The parsing of the presence document can be computationally expensive and may need to be performed on every update. This presence model also allows a subscriber to specify filters for identifying under what conditions the subscriber is to be notified of changes to presence information. For example, a subscriber may request to be notified only when a presence status changes from out-of-office to in-office. Whenever presence information changes, however, the presence server needs to reapply the filter for each subscriber to determine whether the subscriber is to be notified of the updated presence information. The reapplication of the filters by a presence server can also be computationally expensive.

SUMMARY

A method and system for managing presence information based on collections of publications is provided. The presence system creates collections of publications for a publisher. A publication includes a type and value. A publisher may define one collection of publications that is to be made available to certain subscribers and another collection of publications that is to be made available to other subscribers. The presence system may allow a publisher to update individual publications within a collection. Upon receiving the update, the presence server can quickly update the presence information without having to rely on computationally expensive parsing of XML documents. Moreover, the presence system may identify subscribers of a collection at the time of subscription. Thus, when a publication is updated, the presence system can quickly identify the subscribers based on the list of subscribers associated with the collection and need not perform computationally expensive filtering.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
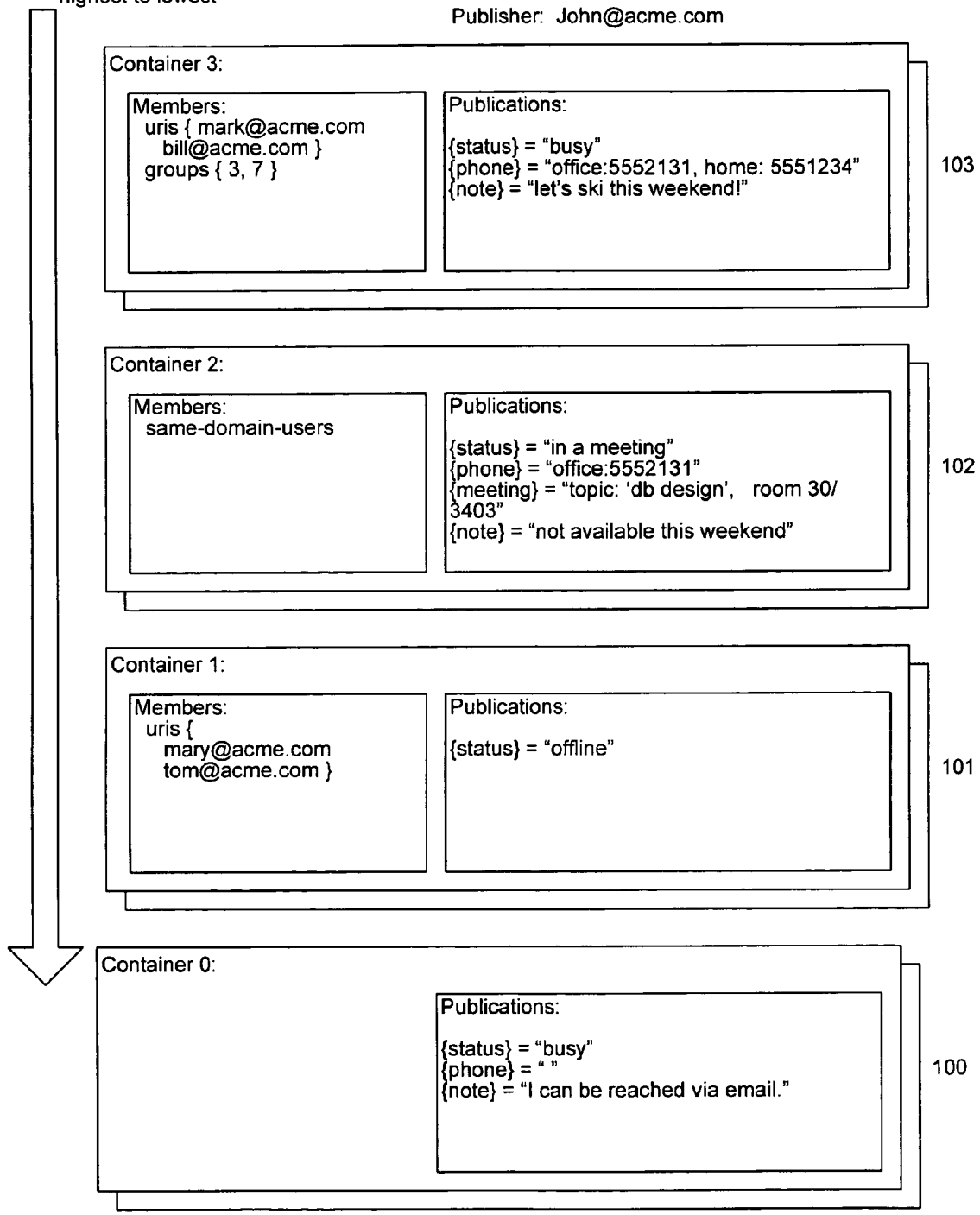
FIG. 1 is a block diagram that illustrates example containers of a publisher in one embodiment.

A method and system for managing presence information based on collections of publications is provided. In one embodiment, the presence system creates collections of publications for a publisher. A publication includes a type and value. For example, the type of a publication may be status, and the value of the publication may be online. As another example, the type of a publication may be phone number, and the value of the publication may be 206-555-5555. A publisher may define one collection of publications that is to be made available to certain subscribers and another collection of publications that is to be made available to other subscribers. For example, a publisher may define a collection of publications that is to be made available to subscribers who are coworkers and may define another collection of publications that is to be made available to all other subscribers. In this example, the publisher may want to publish more detailed information in the collection that is available to coworkers. A publisher may want the status that is available to coworkers to indicate "in a meeting with John," but may want the status that is available to others to simply indicate "unavailable." The presence system may allow a publisher to update individual publications within a collection. For example, a publisher may indicate to update the status within the collection that is available to coworkers to indicate "in a meeting with Bill," but not update the status in the collection that is available to others. Thus, a publisher specifies a collection and publication when updating their presence information. Upon receiving the update, the presence server can quickly update the presence information without having to rely on computationally expensive parsing of XML documents. Moreover, the presence system may identify subscribers of a collection at the time of subscription. For example, each collection may have an associated list of subscribers that is updated whenever the new entity (e.g., user or device) subscribes to the presence information of that collection. Thus, when a publication is updated, the presence system can quickly identify the subscribers based on the list of subscribers associated with the collection and need not perform computationally expensive filtering. If certain subscribers wish to be notified of only certain changes to a publication, then the publisher can establish a new collection in which the value of that publication is only changed to reflect the certain changes. In this way, the presence system can avoid the computationally expensive processing that is required by typical presence models.

In one embodiment, the presence system allows publishers to define their collections, referred to as "containers," to specify the publications that are to be included in each container, and to specify the entities, referred to as "members," who are allowed to subscribe to each container on a container-by-container basis. The presence system allows entities to subscribe to types of a publication. For example, an entity may subscribe to a publication type of "status" of a certain publisher. If the entity is a member of a container that contains a publication with the type of status, then the presence system adds that entity as a subscriber of that container and may specify that the subscriber is only subscribed to the publication type of status for that container. When the publisher updates the status publication of that container, the presence system notifies the subscriber based on a subscriber list of that container.

If a subscriber is a member of multiple containers that contain that same subscribed-to publication type, then the presence system adds that subscriber to the subscriber list of the highest ranked container that contains a publication of the subscribed-to publication type. The ranking of a container may be derived from membership priority and container priority. Membership priority is based in part on how specific the members of a membership type are identified. The publisher may specify the members of a container by specifying membership types of individual entities (e.g., Tom Smith), a group of entities (e.g., Project A Dev Team), entities with a common characteristic (e.g., within domain acme.com), and so on. Since a membership type of an individual entity is more specific than a membership type of a group of entities, the membership type of individual entity has a higher priority. The priority of a container may be specified by the publisher using a priority field, based on a numerical identifier of the container, or some other mechanism. The presence system may rank containers primarily based on membership priority and when an entity is a member of multiple containers with the same membership priority, secondarily based on container priority. For example, assume an entity is identified as part of a certain group that is a member of container 2 with a high container priority that contains a publication type of status, and the entity is also individually identified as a member of container 1 with a low container priority that also contains the publication type of status. The presence system considers container 1 to be ranked higher because the entity is more specifically identified in that container and will subscribe the entity to container 1. If, however, the entity had been individually identified as a member in both containers, then the presence system would consider the container 2 as being ranked higher because both containers have the same membership priority, but container 2 has the higher container priority. In that situation, the presence system would subscribe the entity to that container.

In one embodiment, the presence system may help to synchronize the updates of a publication for different devices of a publisher. For example, a publisher may be online on a cell phone and a laptop at the same time. Both devices may periodically want to update a certain publication such as status. When a device updates a publication or queries a publication, the presence system may provide a synchronization number to the device. When the device next updates that publication, it provides to the presence system the publication with a new value and its synchronization number. If the provided synchronization number is the same as that maintained by the presence system, then the update is synchronized in a sense that the device is updating a value that has not been updated since the synchronization number was received by the device. In such a case, the presence system proceeds to update the publication and to provide the device with a new synchronization number (e.g., one added to the previous synchronization number). If another device had queried the publication and then updated it in the interim, then the synchronization number provided by the later updating device would not have been synchronized. In such a case, the presence system would have notified the device and not updated the publication. The presence system may use many different types of synchronization mechanisms. For example, each device may provide the old value and the new value for a publication. In such a case, the presence system may determine whether the update is synchronized by comparing the value being updated with the old value that is provided along with the new value.

In one embodiment, the presence system may notify a publisher before a new entity is allowed to subscribe to presence information of the publisher. When an entity first requests to subscribe to a publication of any type of a publisher, the presence system may notify the publisher of the request. The publisher may ignore the request or may acknowledge the request indicating approval or disapproval. If the publisher acknowledges the request indicating approval, then the presence system records that the subscriber has been approved by the publisher and adds that subscriber as a subscriber to the appropriate container. If the publisher acknowledges the request indicating disapproval, then the presence system records that the subscriber has been disapproved by the publisher so that the entity will not be allowed to subscribe to any publications. If a subsequent request to subscribe to a publication of the publisher is received from that entity, then the presence system will only allow the subscription if the publisher has approved the first subscription. In this way, the publisher can control which entities are allowed to subscribe to the publisher's presence information. The presence system may allow a publisher the option to automatically approve all subscription requests without notifying the publisher. In either case, the presence system would only subscribe an entity to a container of which it is a member.

In one embodiment, when a publisher adds a new publication to a container or removes a publication from a container, the presence system recalculates the containers to which the subscribers to the type of the new or removed publication should be subscribed. For example, if a publisher removes a status publication from a container, then subscribers to the status publication of that container will no longer be subscribed to the correct container. Similarly, if a publisher adds a status publication to a container, then subscribers to the status publication may no longer be subscribed to the correct container because the container with the new status publication may have a higher ranking for a subscriber. In which case, the presence system needs to recalculate to which container an entity needs to be subscribed.

In one embodiment, the presence system may provide a default container for each publisher. The membership for the default container may include all entities. The publisher can add publications to the default container that the publisher may want to make available to any entity. The publisher, however, may still restrict entities that are allowed to subscribe to a publication of the default container by requesting notification and approval before the presence system subscribes an entity to the default container.

In one embodiment, the presence system may allow the value of the publication to be dynamically derived from values of other publications. For example, each publication may include a type instance identifier. For example, one publication may have a type of status and an instance identifier of cell phone, another publication may have a type of status and an instance identifier of laptop, and another publication may have a type of status and an instance identifier of overall. Publishers publish publications by specifying type and instance identifier, and subscribers subscribe to publications by specifying type and instance identifier. The presence system may also allow certain publications to be "non-published." For example, a publisher may specify that their overall status publication should be published, but not their cell phone or laptop status publications. The presence system may calculate the value for certain publications based on the value of other publications, referred to as an "aggregate value." For example, the presence system may update the overall status publication whenever the cell phone or laptop status publication is updated. The presence system may allow a publisher to specify an arbitrary algorithm (e.g., a script) to be used when calculating an aggregate value. The publisher may also specify input publications so that the presence system can perform the algorithm whenever an input publication is updated. If the output of the algorithm indicates that the value of the publication has changed, then the presence system notifies the subscribers as appropriate. A publisher may designate an input publication to be non-published so that subscribers will not see the value of that input publication directly.

FIG. 1 is a block diagram that illustrates example containers of a publisher in one embodiment. In this example, the publisher has four containers 100-103, named container 0 through container 3. Container 0 is the default container and contains publications for the types of status, phone, and note and contains a default membership list identifying all entities as members. The default membership list has the lowest membership priority. As a result, the presence system subscribes an entity to the default container only if that entity is not a member of another container that contains the subscribed-to publication type. Container 1 contains a publication with a type of status and contains a membership list with two members individually identified. Container 2 contains publications with the types of status, phone, meeting, and note and contains a membership list indicating that the members are entities within the same domain as the publisher. Container 3 contains publications with the types of status, phone, and note and contains a membership list that individually identifies some entities and identifies groups of other entities. The container priority is based on their container numbers. Thus, container 3 has the highest container priority, and container 0 as the lowest container priority. The containers are for the publisher with the URI John@acme.com. If the entity Mary@acme.com subscribes to the status publication, then the presence system will subscribe Mary@acme.com to container 1. Although Mary@acme.com is also a member of container 2, Mary@acme.com is individually listed in container 1, which results in container 1 having a higher membership priority and thus being ranked higher. If the publisher removed status publication from container 1, then the presence system would recalculate the container to which Mary@acme.com is subscribed and identify container 2 as the highest ranked container.

Figure 2:
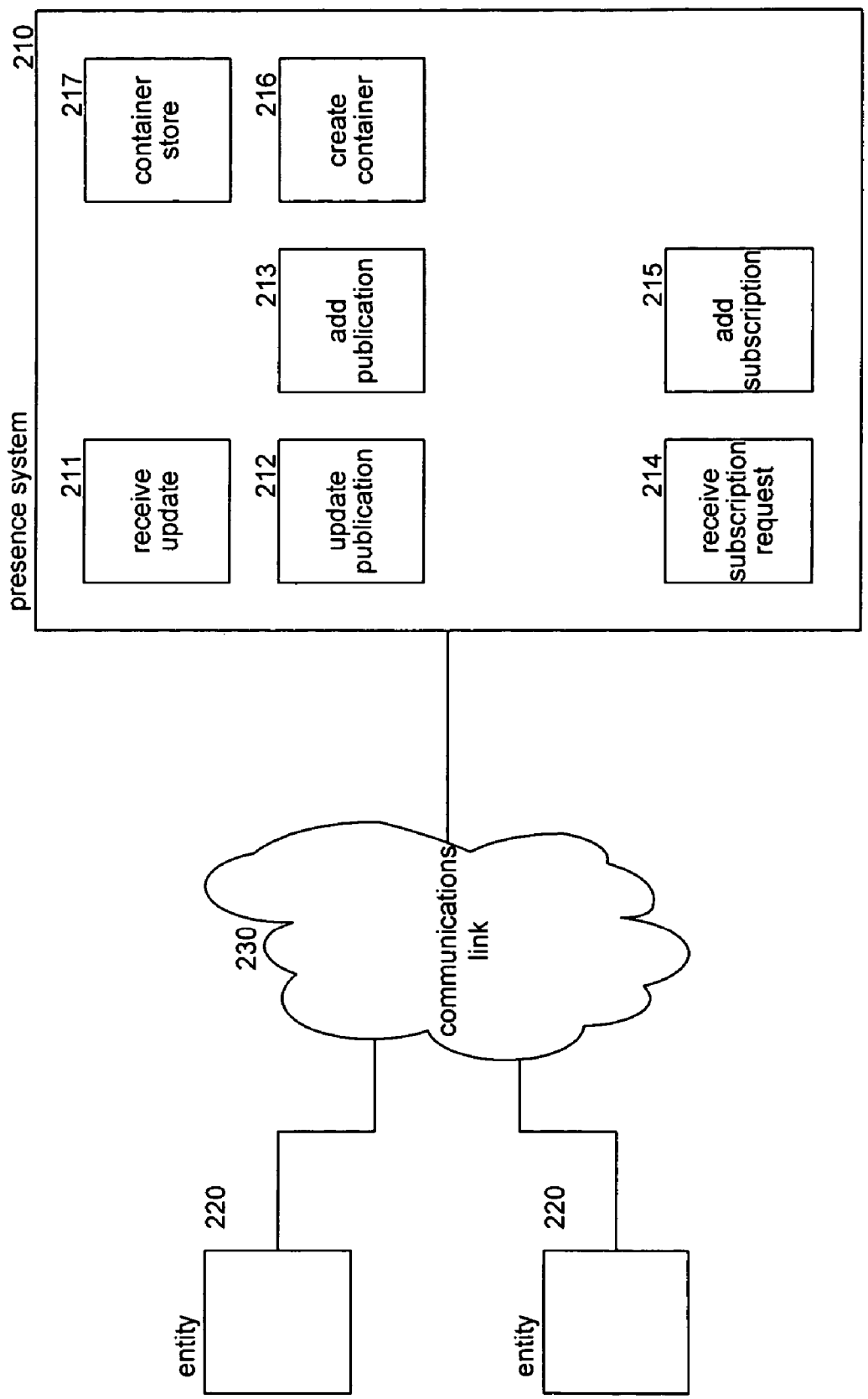
FIG. 2 is a block diagram that illustrates components of the presence system in one embodiment.

FIG. 2 is a block diagram that illustrates components of the presence system in one embodiment. The presence system 210 is connected to entity devices 220 via a communications link 230. The entity devices correspond to entities that may be publishers or subscribers. The presence system includes a receive update component 211, an update publication component 212, an add publication component 213, a receive subscription request component 214, an add subscription component 215, a create container component 216, and a container store 217. The container store contains the containers of the publishers (created by the create container component) and other data structures used by the presence system. The receive update component is invoked when a request to update a publication is received from a publisher. The receive update component invokes the update publication component to update the publication and the add publication component to add a new publication to a container. The receive subscription request component is invoked when a request is received from an entity to subscribe to a type of publication of a publisher. The receive subscription request component invokes the add subscription component to subscribe the entity to the type of publication. Although not shown in FIG.

2, the entity devices include components of the presence system to define containers and their memberships, to send publication updates, to send subscription requests, and to receive notifications of updates to publications.

The computing devices on which the presence system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the presence system. In addition, the data structures and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the presence system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The user devices may be cell phones, personal digital assistants, smart phones, personal computers, programmable consumer electronics, digital cameras, and so on.

The presence system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
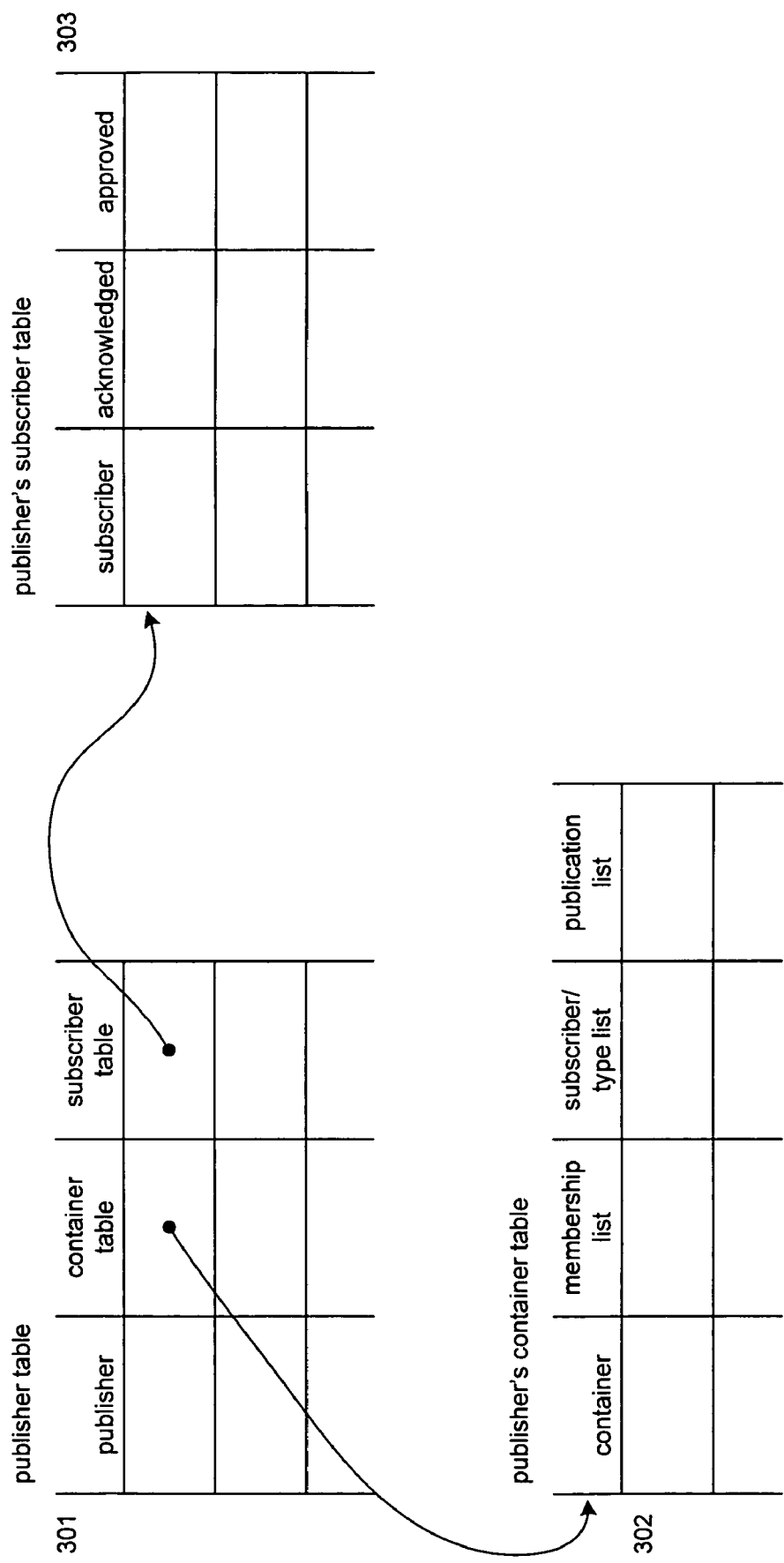
FIG. 3 is a data structure diagram that illustrates example logical data structures of the presence system in one embodiment.

FIG. 3 is a data structure diagram that illustrates example logical data structures of the presence system in one embodiment. The data structure includes a publisher table 301 that includes an entry for each publisher. Each entry points to a publisher's container table 302, and a publisher's subscriber table 303. The publisher's container table contains an entry for each container of the corresponding publisher. Each entry identifies the container (e.g., by name) and contains a membership list, a subscriber/type list, and a publication list. The membership list contains the membership for the container. The subscriber/type list contains an entry for each subscriber and the type of publication of the container to which the subscriber is subscribed. The publication list contains an entry for each publication of the container. When a publication of a container is updated, the presence system uses the subscriber/type list to identify the subscribers that are to be notified. When an entity subscribes to a publication type, the presence system uses the membership priority and container priority to identify the highest ranked container. The presence system then adds to the subscriber/type list for that identified container an entry that identifies the entity and the publication type. The publisher's subscriber table contains an entry for each entity that has requested to subscribe to a production type of the publisher. Each entry identifies the entity and indicates whether the publisher has acknowledged and approved the request to subscribe. One skilled in the art will appreciate that this is only one example of the logical layout of data structures of the presence system. The data structures of the presence system may be tailored to the space/computation requirements of the presence system.

Figure 4:
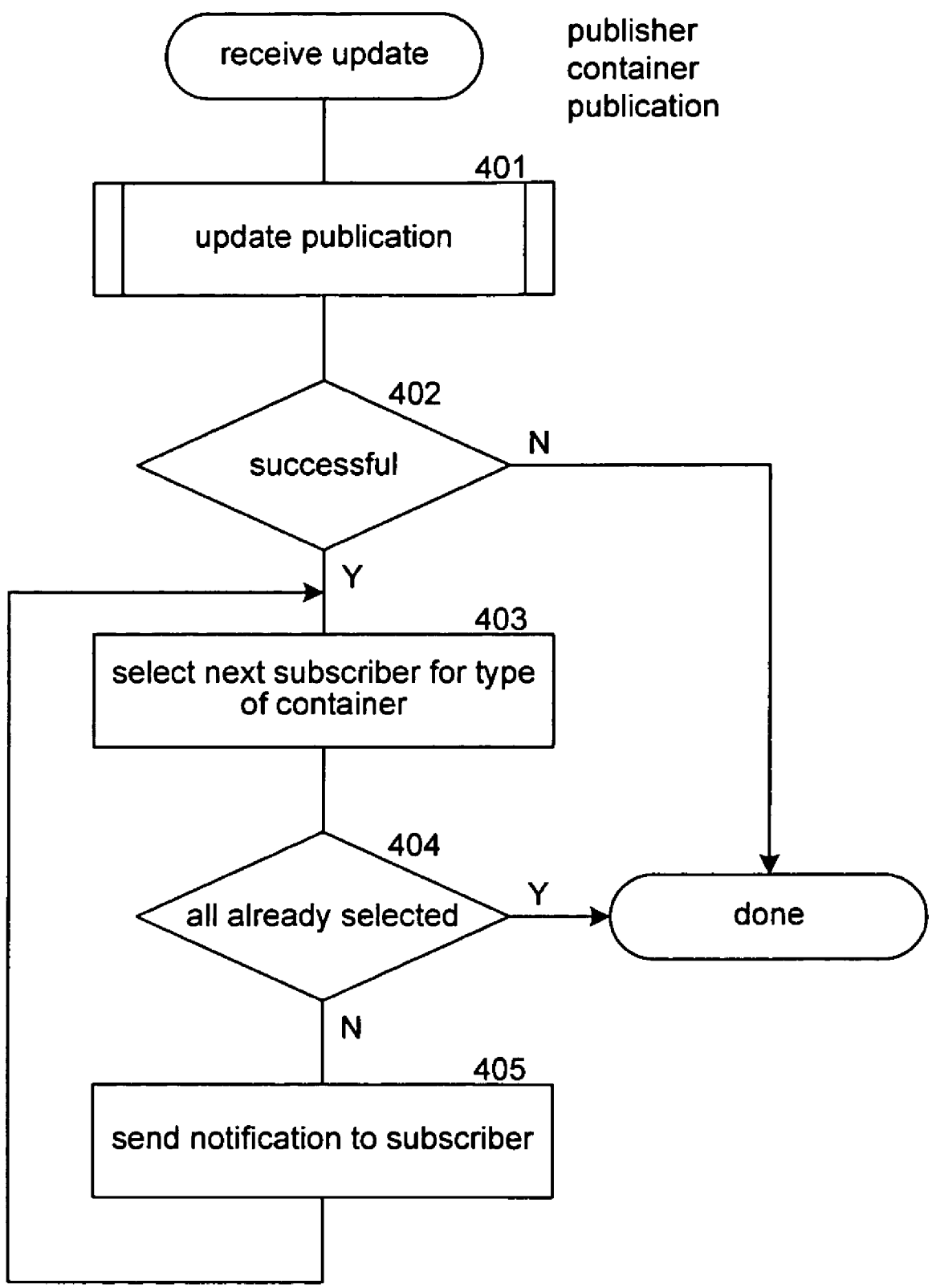
FIG. 4 is a flow diagram that illustrates the processing of the receive update component of the presence system in one embodiment.

FIG. 4 is a flow diagram that illustrates the processing of the receive update component of the presence system in one embodiment. The component is passed the identification of a publisher and container and a publication including publication type and value. The component updates the publication within that container and notifies the subscribers as appropriate. In block 401, the component invokes the update publication component to update the publication. In decision block 402, if the update was successful, then the component continues at block 403 to notify the subscribers, else the component completes. The update may not be successful, for example, when the update is not synchronized. In blocks 403-405, the component loops notifying the subscribers. In block 403, the component selects the next subscriber of the container for the publication type. In decision block 404, if all such subscribers have already been selected, then the component completes, else the component continues at block 405. In block 405, the component sends a notification to the selected subscriber and then loops to block 403 to select the next subscriber.

Figure 5:
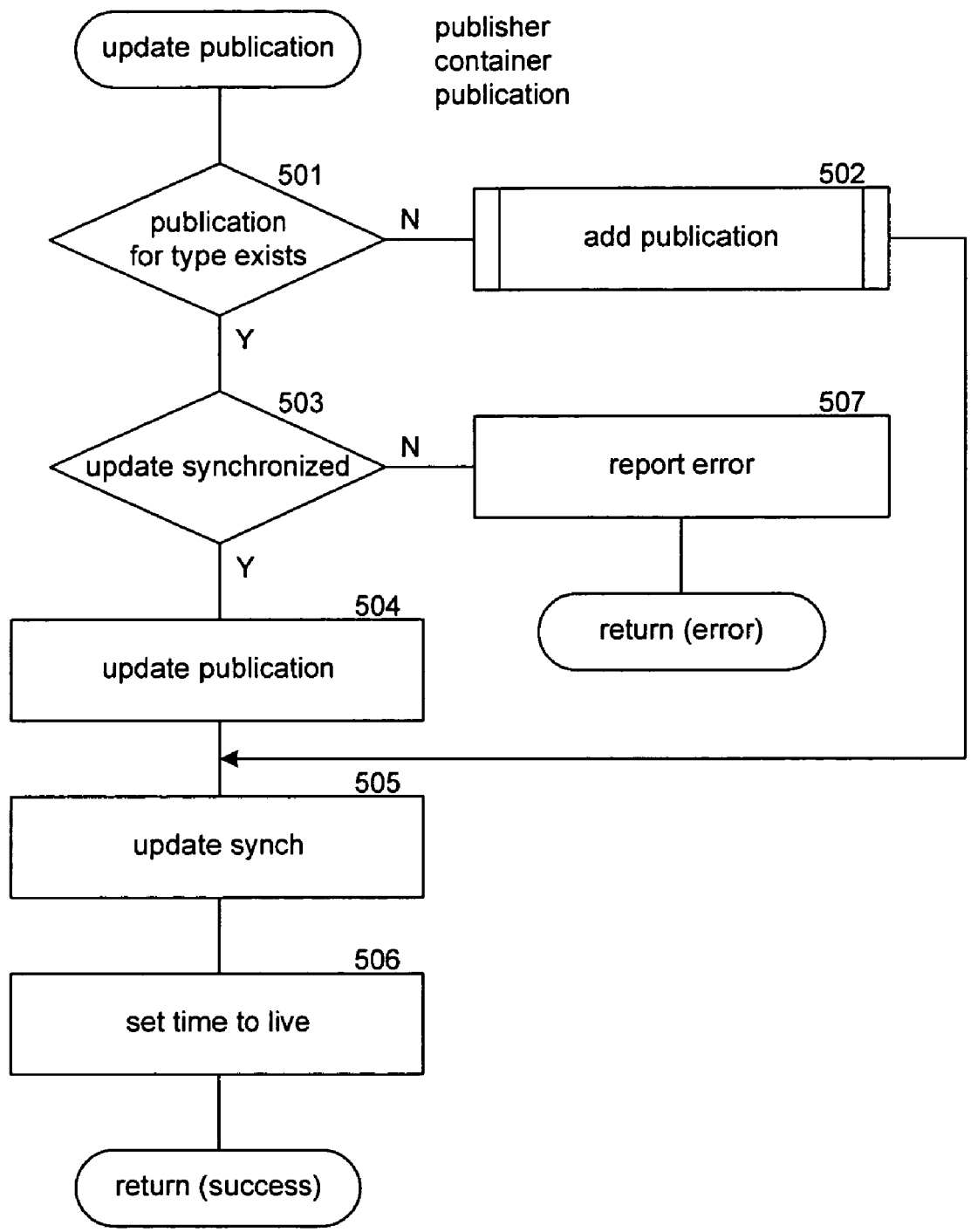
FIG. 5 is a flow diagram that illustrates the processing of the update publication component of the presence system in one embodiment.

FIG. 5 is a flow diagram that illustrates the processing of the update publication component of the presence system in one embodiment. The component is passed the identification of a publisher and container and a publication. The component updates the corresponding publication of the container or adds the publication to that container as appropriate. In decision block 501, if a publication of the passed publication type exists in the container, then the component continues at block 503, else the component continues at block 502. In block 502, the component invokes the add publication component to add the publication to the container and then continues at block 505. In decision block 503, if the update is synchronized, then the component continues at block 504, else the component continues at block 507 to report an error to the publisher and then returns an error. In block 504, the component updates the publication of the container. In block 505, the component updates the synchronization mechanism. In block 506, the component sets the time to live of the publication and then returns an indication of success. The presence system may periodically clean up publications whose time to live has expired.

Figure 6:
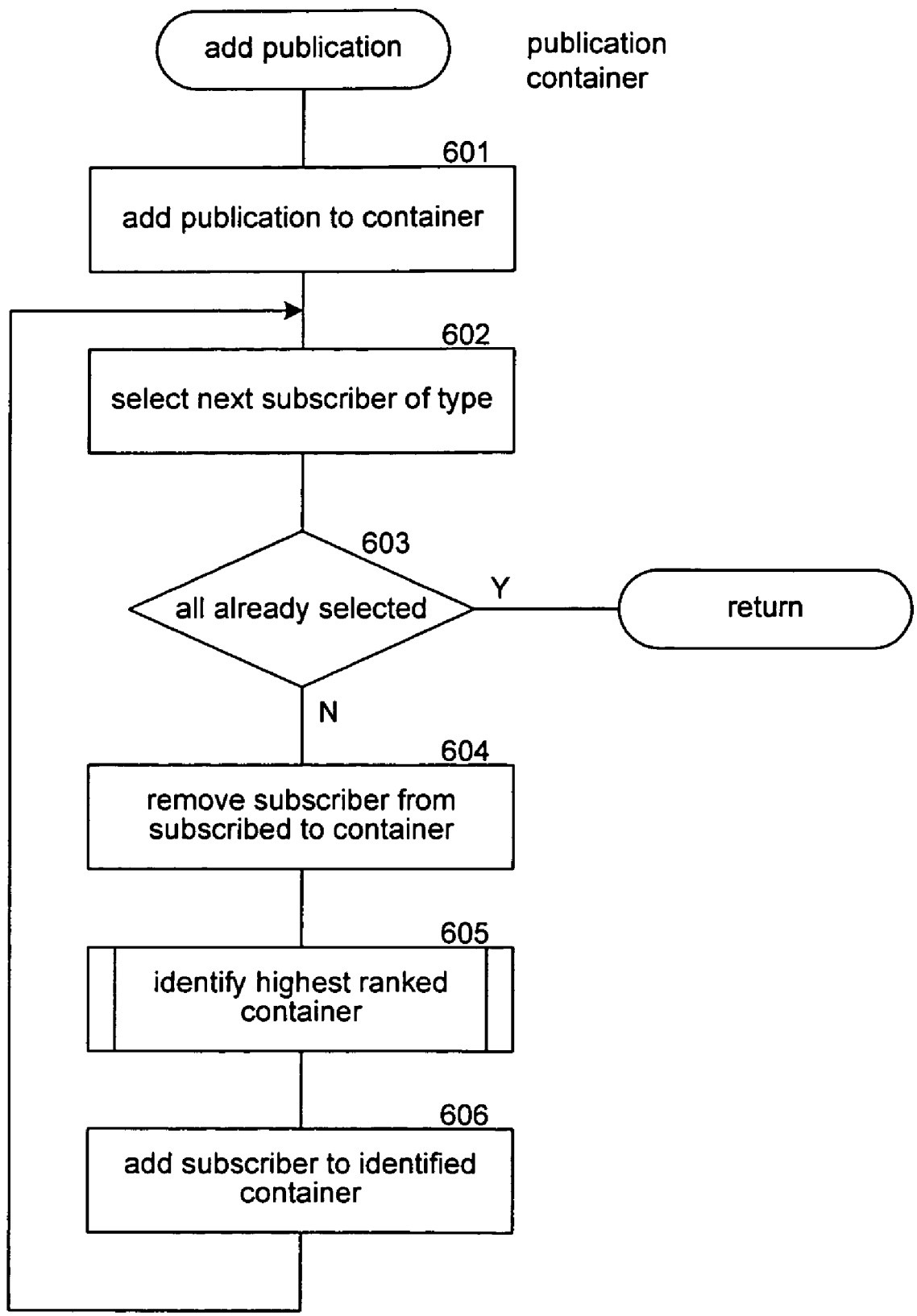
FIG. 6 is a flow diagram that illustrates the processing of the add publication component of the presence system in one embodiment.

FIG. 6 is a flow diagram that illustrates the processing of the add publication component of the presence system in one embodiment. The component is passed publication and a container and adds a publication to the container and updates the subscriber lists of the containers as appropriate. In block 601, the component adds the publication to the container. In blocks 602-606, the component loops updating the subscriber lists of the containers. In block 602, the component selects the next subscriber of the type of the newly added publication. The component may identify the subscribers from the publisher's type table. In decision block 603, if all such subscribers have already been selected, then the component returns, else the component continues at block 604. In block 604, the component removes the subscriber from the container to which it is currently subscribed. In block 605, the component invokes a component to identify the highest ranked container for the selected subscriber for the publication type. In block 606, the component adds the subscriber to the identified container and then loops to block 602 to select the next subscriber.

Figure 7:
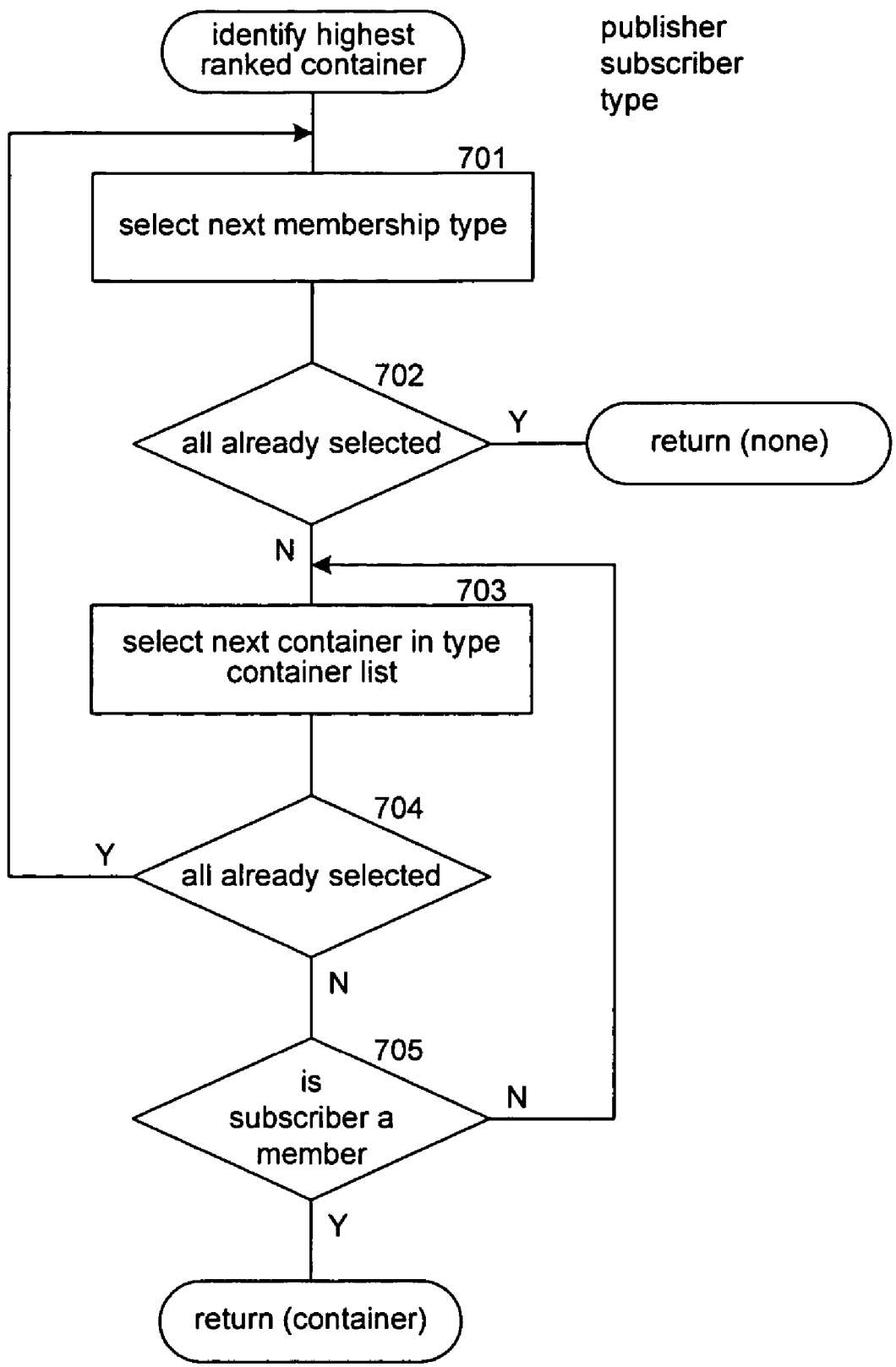
FIG. 7 is a flow diagram that illustrates the processing of the identify highest ranked container component of the presence system in one embodiment.

FIG. 7 is a flow diagram that illustrates the processing of the identify highest ranked container component of the presence system in one embodiment. The component is passed the identification of a publisher and subscriber and a publication type. The component identifies the highest ranked container for that subscriber for that publication type. In block 701, the component selects the next membership type in membership priority order starting with the membership type with the highest priority. The component may consider the membership type of all entities of the default container to have the lowest priority so that the default container is only selected when no other container that has the publication type also has the subscriber as a member. In decision block 702, if all the membership types have already been selected, then the component returns an indication that none was selected, else the component continues at block 703. In blocks 703-705, the component loops selecting the containers in container priority order. In block 703, the component selects the next container that contains the passed publication type. In decision block 704, if all the containers have already been selected, that the component loops to block 701 to select the next membership type, else the component continues at block 705. In decision block 705, if the passed subscriber is a member of the selected container, then the component returns the container, else the component loops to block 703 to select the next container.

Figure 8:
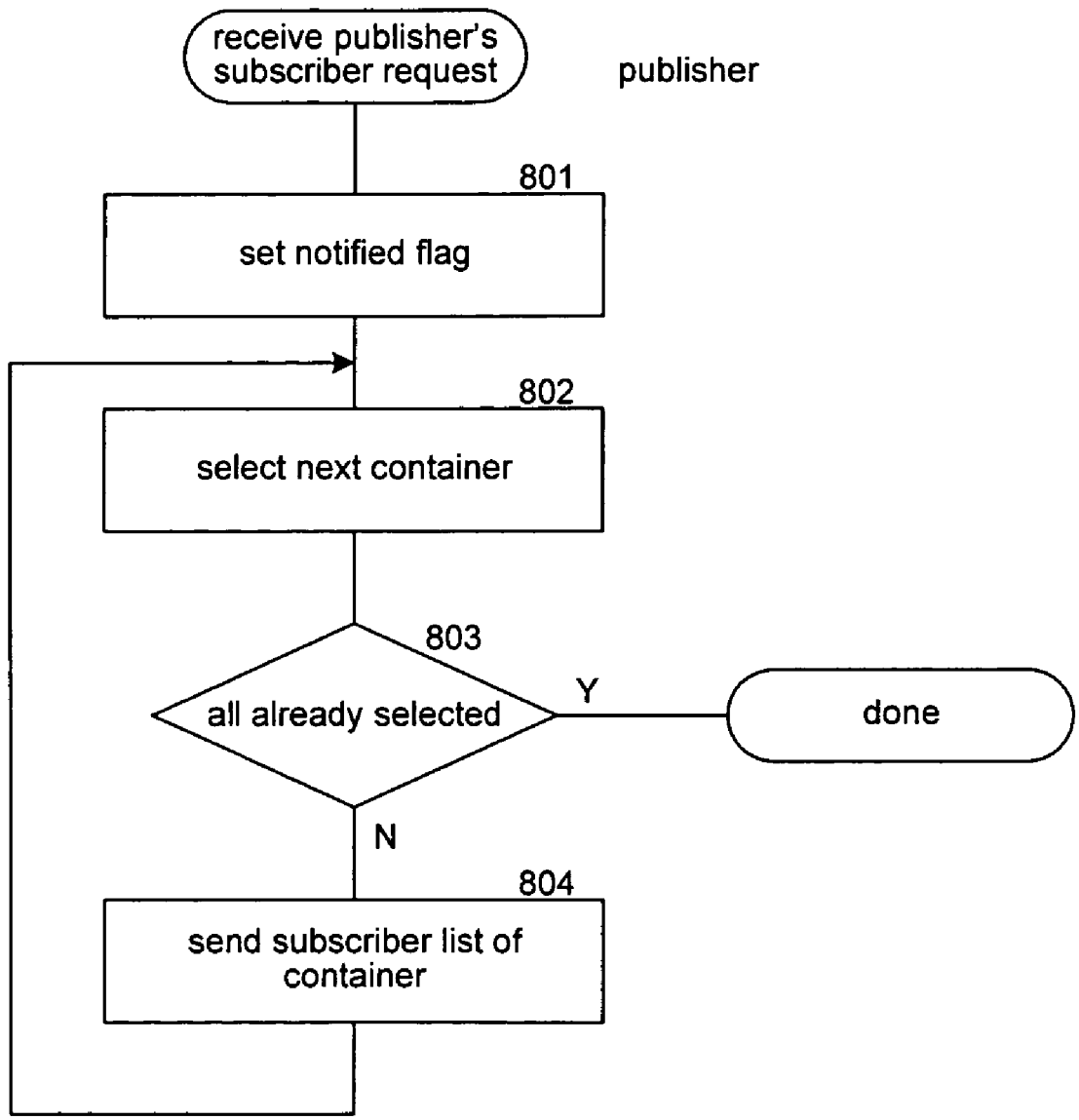
FIG. 8 is a flow diagram that illustrates the processing of the receive publisher's subscriber request component of the presence system in one embodiment.

FIG. 8 is a flow diagram that illustrates the processing of the receive publisher's subscriber request component of the presence system in one embodiment. The component is invoked when a publisher requests to be notified before an entity is allowed to subscribe to the publisher's presence information. In block 801, the component sets a notify flag, which may be contained in the publisher table, to indicate that the publisher wants to be notified. In block 802, the component selects the next container of the publisher. In decision block 803, if all the containers have already been selected, then the component completes, else the component continues at block 804. In block 804, the component sends a list of the current subscribers of the container to the publisher and then loops to block 802 to select the next container.

Figure 9:
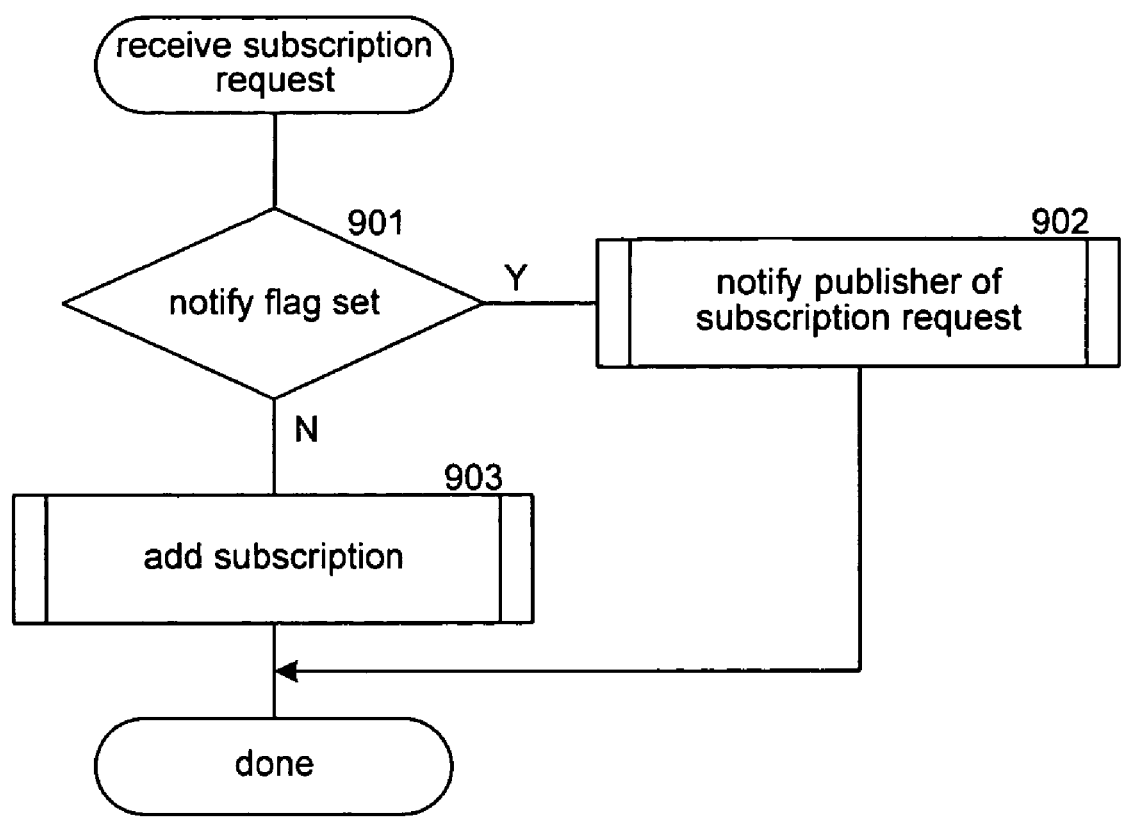
FIG. 9 is a flow diagram that illustrates the processing of the receive subscription request component of the presence system in one embodiment.

FIG. 9 is a flow diagram that illustrates the processing of the receive subscription request component of the presence system in one embodiment. The component is invoked when the presence system receives a subscription request from an entity. In decision block 901, if the notify flag of the publisher is set, then the component continues at block 902, else the component continues at block 903. In block 902, the component invokes a notify publisher of subscription request component and then completes. Alternatively, the component may add the subscriber to the default container. In block 903, the component invokes the add subscription component and then completes.

Figure 10:
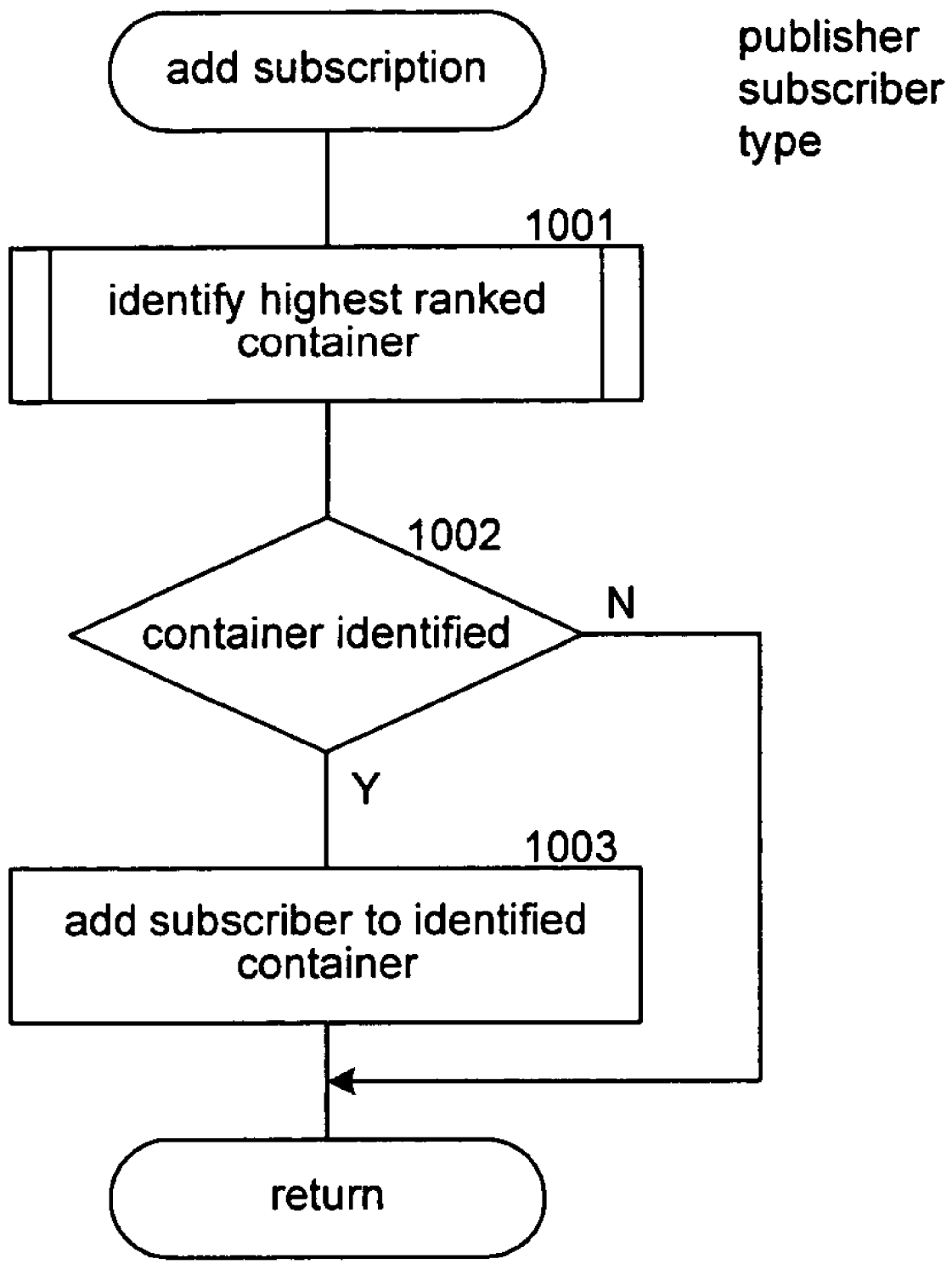
FIG. 10 is a flow diagram that illustrates the processing of the add subscription component of the presence system in one embodiment.

FIG. 10 is a flow diagram that illustrates the processing of the add subscription component of the presence system in one embodiment. The component is passed the identification of a publisher and subscriber and a publication type. In block 1001, the component invokes the identify highest ranked container for the subscriber and the publication type. In decision block 1002, if a container is identified, then the component adds the subscriber to the identified container in block 1003. The component then returns.

Figure 11:
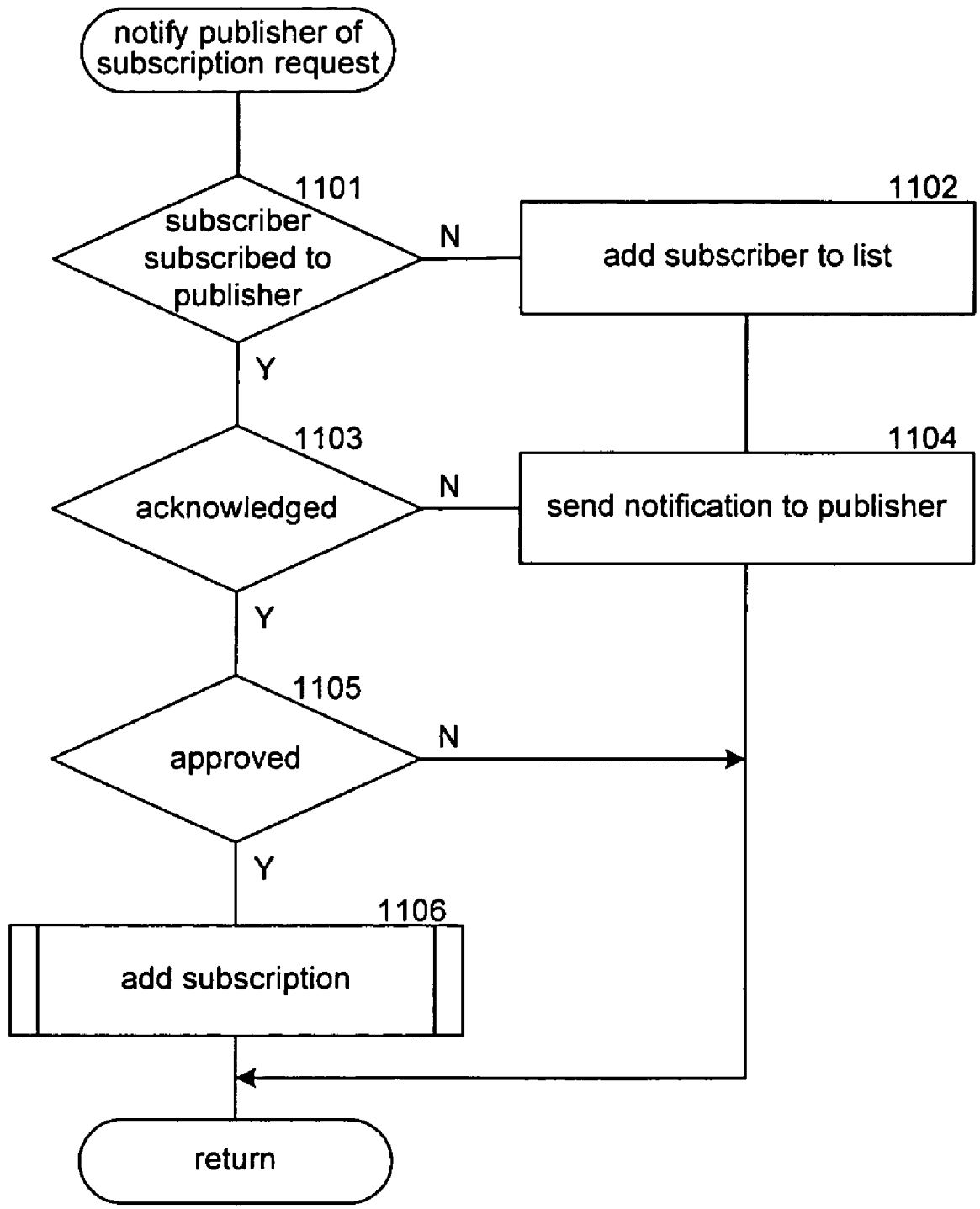
FIG. 11 is a flow diagram that illustrates the processing of the notify publisher of subscription request component of the presence system in one embodiment.

FIG. 11 is a flow diagram that illustrates the processing of the notify publisher of subscription request component of the presence system in one embodiment. The component notifies a publisher that a named entity has requested to subscribe to the presence information of that publisher. In decision block 1101, if the subscriber has already requested to subscribe to the publisher, then the component continues at block 1103, else the component continues at block 1102. In block 1102, the component adds the subscriber to the list of subscribers for the publisher. In decision block 1103, if the publisher has acknowledged the request to subscribe, then the component continues at block 1105, else the component continues at block 1104. In block 1104, the component sends a notification to the publisher requesting acknowledgment and then returns. The request may identify all those subscribers for whom the publisher has not yet acknowledged. In decision block 1105, if the subscriber has been approved by the publisher, then the component continues at block 1106, else the component returns. In block 1106, the component invokes the add subscription component and then returns.

Figure 12:
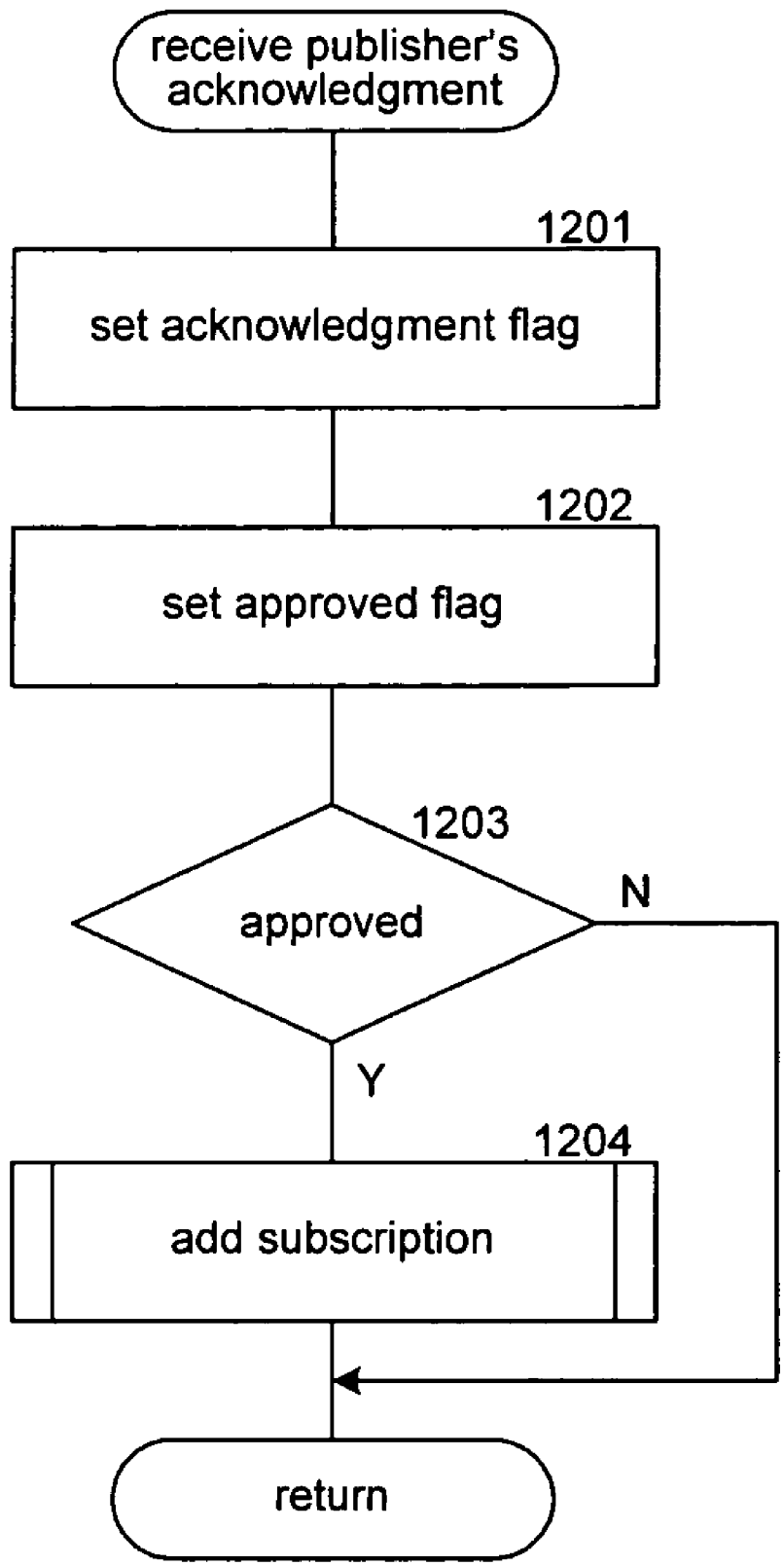
FIG. 12 is a flow diagram that illustrates the processing of the receive publisher's acknowledgment component of the presence system in one embodiment.

FIG. 12 is a flow diagram that illustrates the processing of the receive publisher's acknowledgment component of the presence system in one embodiment. The component is invoked when a publisher sends an acknowledgment to a subscriber's request to subscribe to a publication of the publisher. In block 1201, the component sets the acknowledgment flag. In block 1202, the component sets the approved flag to indicate whether the publisher has approved the entity to subscribe. In decision block 1203, if the publisher has approved the subscriber, then the component invokes the add subscription component in block 1204. The component then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the publications of a container could be defined using an XML schema, but since each container typically contains only a subset of the possible publications, the parsing may not be as computationally expensive as with other presence models. In addition, the presence system could be adapted to allow a subscriber to specify complex filtering that may be applied on a publication-by-publication basis. Accordingly, the invention is not limited except as by the appended claims.

We claim:

1. A computer-implemented method for managing presence information, the method comprising:

creating, and storing in one or more computer storage media, collections of publications for a publisher including a first collection and a second collection, each publication having a type and value, wherein the publications comprise a status indicating the availability of a user, and wherein the first collection has a first publication of a first type and a first value, and wherein the second collection has the first publication of the first type and a second value, and wherein the first value comprises more detailed information than the second value;

receiving a request from a subscriber to subscribe to the first type of publication within the collections of publications;

in response to the request, determining that the subscriber should be subscribed to the first collection, wherein the first collection comprises a highest rank of collections that contains the first publication of the first type, wherein the determining comprises:

identifying a membership type for the subscriber, wherein the membership type is of a highest membership priority, wherein the highest membership priority is based on identifying members specifically;

determining whether at least one of the collections of publications includes the membership type; and determining that the first collection includes the membership type;

upon receiving an update to the first value of the publication of the first collection assigned the highest rank, updating the first value of the publication within the first collection assigned the highest rank by storing the update in the one or more computer storage media; and sending a notification to the subscriber to the first collection assigned the highest rank.

2. The method of claim 1 wherein each of the collections has members and a subscriber is only subscribed to a collection of which it is a member.

3. The method of claim 1 wherein a publication includes an instance identifier.

4. The method of claim 3 including generating an aggregate value for a publication of a collection that has multiple publications for the same type with different instance identifiers.

5. The method of claim 1 wherein a publication specifies whether it is to be published.

6. The method of claim 1 wherein a publication includes instructions for calculating its value.

7. The method of claim 6 wherein the value is updated whenever data used to calculate the value changes.

8. A computer-readable media containing instructions for controlling a device to manage presence information, by a method comprising:
   creating, and storing in one or more computer storage media, collections of publications for a publisher including a first collection and a second collection, each publication having a type and value, wherein the publications comprise a status indicating the availability of a user, and wherein the first collection has a first publication of a first type and a first value, and wherein the second collection has the first publication of the first type and a second value, and wherein the first value comprises more detailed information than the second value;
   receiving a request from a subscriber to subscribe to the first type of publication within the collections of publications;
   in response to the request, determining that the subscriber should be subscribed to the first collection, wherein the first collection comprises a highest rank of collections that contains the first publication of the first type, wherein the determining comprises:
      identifying a membership type for the subscriber, wherein the membership type is of a highest membership priority, wherein the highest membership priority is based on identifying members specifically;
      determining whether at least one of the collections of publications includes the membership type; and
      determining that the first collection includes the membership type;
   upon receiving an update to the first value of the publication of the first collection assigned the highest rank, updating the first value of the publication within the first collection assigned the highest rank by storing the update in the one or more computer storage media; and sending a notification to the subscriber to the first collection assigned the highest rank.

9. A computer-readable media of claim 8 wherein the updating updates all the publications of the specified first collection.

10. A computer-readable media of claim 8 wherein the updating updates only a specified first publication of the collection.

11. A computer-readable media of claim 8 wherein different collections contain publications with a same type.

12. A computer-readable media of claim 8 including notifying a subscriber of an update to a publication.

13. A computer-readable media of claim 8 wherein a collection has members and wherein a subscriber is subscribed to only collections of which the subscriber is a member.

14. A system for managing presence information, the system comprising:
   one or more processors for executing computer executable instructions; and
   one or more computer-readable media that store the computer executable instructions that when executed provide:
      a component that creates collections of publications for a publisher including a first collection and a second collection, each publication having a type and value, wherein the publications comprise a status indicating the availability of a user, and wherein the first collection has a first publication of a first type and a first value, and wherein the second collection has the first publication of the first type and a second value, and wherein the first value comprises more detailed information than the second value;
      a component that:
         receives a request from a subscriber to subscribe to the first type of the first publication within the collections of publications;
         in response to the request, determines that the first subscriber should be subscribed to the first collection, wherein the first collection comprises a highest rank of collections that contains the first publication of the first type, wherein the determination comprises:
            identifies a membership type for the subscriber, wherein the membership type is of a highest membership priority, wherein the highest membership priority is based on identifying members specifically;
            determines whether at least one of the collections of publications includes the membership type; and
            determines that the first collection includes the membership type; and
         receives from the publisher an update to the first collection assigned the highest rank;
      a component that sends to a server an update to the first publication in the first collection assigned the highest rank; and
      a component that sends to the server an indication of members who are authorized to subscribe to the publications of the first collection assigned the highest rank.

15. The system of claim 14 wherein the members are authorized on a collection-by-collection basis.

16. The system of claim 14 including a component that receives from the server a notification that an entity is requesting to subscribe to presence information of the publisher and that sends to the server an indication as to whether the publisher will allow the entity to subscribe.

* * * * *